United States Patent
LaCous et al.

(10) Patent No.: US 10,002,244 B2
(45) Date of Patent: Jun. 19, 2018

(54) UTILIZATION OF BIOMETRIC DATA

(71) Applicant: BIO-key International, Inc., Wall, NJ (US)

(72) Inventors: Mira K. LaCous, Eagan, MN (US); Gary L. Zarn, Lakeville, MN (US)

(73) Assignee: BIO-key International, Inc., Wall, NJ (US)

( * ) Notice: Subject to any disclaimer, the term of this patent is extended or adjusted under 35 U.S.C. 154(b) by 0 days. days.

(21) Appl. No.: 15/474,492

(22) Filed: Mar. 30, 2017

(65) Prior Publication Data

US 2017/0206345 A1 Jul. 20, 2017

Related U.S. Application Data

(63) Continuation of application No. 14/640,336, filed on Mar. 6, 2015, now Pat. No. 9,646,146.
(Continued)

(51) Int. Cl.
*G06F 21/32* (2013.01)
*H04N 21/4415* (2011.01)
*G06K 9/00* (2006.01)

(52) U.S. Cl.
CPC ...... *G06F 21/32* (2013.01); *G06F 2221/2151* (2013.01); *G06K 9/00087* (2013.01)

(58) Field of Classification Search
None
See application file for complete search history.

(56) References Cited

U.S. PATENT DOCUMENTS 6,047,281 A  4/2000  Wilson et al.
6,047,282 A  4/2000  Wilson et al.
(Continued)

FOREIGN PATENT DOCUMENTS

JP    2002-229953 A    8/2002
WO   WO 2009/079219 A1   6/2009

OTHER PUBLICATIONS

Jain et al., "Score Normalization in Multimodel Biometric Systems," Pattern Recognition, vol. 38, Issue 12, Dec. 2005, 2 pages.
(Continued)

*Primary Examiner* — Venkat Perungavoor
(74) *Attorney, Agent, or Firm* — Kelly, Holt & Christenson, PLLC; Katherine M. Scholz

(57) ABSTRACT

A method for authenticating a user on a device is provided. The method comprises receiving an authentication request. The method also comprises checking a memory cache for available biometric data. The method also comprises retrieving the available biometric data from the memory cache. Retrieving available biometric data comprises retrieving a plurality of biometric data portions. The portions are retrieved such that a first biometric data portion is retrieved before a second biometric data portion. The second biometric data portion was captured before the first biometric data portion. Retrieving available biometric data also comprises determining whether each of the plurality of biometric data portion comprises verified biometric data. The method also comprises comparing the retrieved biometric data portions to an enrollment template and, upon determining that the retrieved biometric data portions matches the enrollment template, indicating that an authentication is complete.

6 Claims, 9 Drawing Sheets

Related U.S. Application Data

(60) Provisional application No. 61/950,424, filed on Mar. 10, 2014, provisional application No. 62/041,711, filed on Aug. 26, 2014, provisional application No. 62/052,820, filed on Sep. 19, 2014.

(56) References Cited

U.S. PATENT DOCUMENTS

| | | | |
|---|---|---|---|
| 6,070,159 | A | 5/2000 | Wilson et al. |
| 6,240,200 | B1 | 5/2001 | Wendt et al. |
| 6,591,224 | B1 | 7/2003 | Sullivan et al. |
| 6,895,104 | B2 | 5/2005 | Wendt et al. |
| 7,117,356 | B2 | 10/2006 | LaCous |
| 7,155,040 | B2 | 12/2006 | Nikiforov |
| 7,203,343 | B2 | 4/2007 | Manasse et al. |
| 7,359,553 | B1 | 4/2008 | Wendt et al. |
| 7,415,605 | B2 | 8/2008 | LaCous |
| 7,454,624 | B2 | 11/2008 | LaCous |
| 7,502,938 | B2 | 3/2009 | LaCous |
| 7,539,331 | B2 | 5/2009 | Wendt et al. |
| 8,055,027 | B2 | 11/2011 | Nikiforov |
| 8,214,652 | B2 | 7/2012 | LaCous |
| 8,442,967 | B2 | 5/2013 | Brauckmann et al. |
| 2003/0123714 | A1* | 7/2003 | O'Gorman ......... G06K 9/00026 382/124 |
| 2004/0208348 | A1 | 10/2004 | Baharav |
| 2005/0039053 | A1 | 2/2005 | Walia |
| 2005/0207626 | A1 | 9/2005 | Kang |
| 2005/0244039 | A1 | 11/2005 | Geoffroy |
| 2006/0181521 | A1 | 8/2006 | Perreault et al. |
| 2007/0214365 | A1 | 9/2007 | Cornett et al. |
| 2008/0159598 | A1 | 7/2008 | Iasso |
| 2008/0212846 | A1* | 9/2008 | Yamamoto ......... G06K 9/00087 382/115 |
| 2008/0235233 | A1 | 9/2008 | Holden |
| 2009/0064303 | A1 | 3/2009 | Dickinson et al. |
| 2010/0017856 | A1 | 1/2010 | Mercredi et al. |
| 2010/0080424 | A1 | 4/2010 | Hayashi |
| 2011/0191329 | A1 | 8/2011 | Petrov et al. |
| 2013/0083975 | A1 | 4/2013 | Partington et al. |
| 2013/0086090 | A1 | 4/2013 | Partington et al. |
| 2013/0160144 | A1 | 6/2013 | Mok et al. |
| 2013/0246388 | A1 | 9/2013 | Benini |
| 2013/0259330 | A1* | 10/2013 | Russo ............... G06K 9/00087 382/124 |
| 2016/0364600 | A1* | 12/2016 | Shah .................... G06F 21/629 |

OTHER PUBLICATIONS

Jain et al., "Multibiometric Systems," Commun. ACM 47, 1 (Jan. 2004), pp. 34-40.

Maltoni et al., "Handbook of Fingerprint Recognition," Second Edition, Springer, 2009, 509 pages.

International Search Report and Written Opinion of International Application No. PCT/US2015/024009, dated Jun. 2, 2015, 10 pages.

International Search Report and Written Opinion of International Application No. PCT/US2014/058978, dated Jan. 5, 2015; date of filing: Oct. 3, 2014, 12 pages.

International Search Report and Written Opinion of International Application No. PCT/US2015/019141, dated Sep. 13, 2015; date of filing: Mar. 6, 2015, 16 pages.

Prosecution History of U.S. Appl. No. 14/640,336, filed Mar. 6, 2015, 70 pages.

\* cited by examiner

UTILIZATION OF BIOMETRIC DATA

CROSS REFERENCE TO RELATED APPLICATION

The present application is a continuation of U.S. Non-Provisional application with Ser. No. 14/640,336, filed Mar. 6, 2015, which claims the priority of U.S. Provisional Application Ser. No. 61/950,424, filed on Mar. 10, 2014, U.S. Provisional Application Ser. No. 62/041,711, filed Aug. 26, 2014, and U.S. Provisional Application 62/052,820, filed Sep. 19, 2014 the contents of which applications are hereby incorporated by reference in its entirety.

BACKGROUND

Companies and their customers seek the best of both worlds when it comes to online transactions—convenience and security. With the rise of smart phones and other mobile devices, wearable devices, Internet of Things (IoT) products, vehicles, home automation, robotics and drones, all capable of accessing and completing transactions on the internet, the need for security is growing. However, for most customers, the process of remembering a myriad of passwords for different sites and/or applications presents a burden, especially as these sites increasingly require more complex passwords or other authentication means in an effort to protect customers.

One solution to the security inconvenience problem is the use of an intermediary, trusted website to authenticate the user. Social media websites are one example of some providers of said third party authentication options. This still requires the user to login, or be logged in, to one of these intermediary sites at the time of the authentication request. While this may lower the number of passwords for the customer to remember, it also heightens the potential risk in case of cellphone or laptop theft, or hacking of one of these intermediary sites where only a password or other set of weak forms of authentication may exist.

Another solution is the use of biometric data to validate the identity of a user of a device. The advantages of biometric data as an authentication source are clear: the user is not required to remember an alphanumeric sequence or carry a token, the biometric data cannot be easily replicated, and unauthorized access to the user's protected accounts and information is prohibited. The biometric data used for matching may be on the device, or in the cloud. Each offer differing benefits in regard to speed, assurance and accuracy. The embodiments of the invention will be described with respect to fingerprints and fingerprint data, as fingerprints provide a unique and reliable biometric sample for authentication. However, one skilled in the art would understand that other biometric data could also be used with the systems and methods described, for example iris patterns, eye vein patterns, palm prints, face, DNA, etc.

Each person has a unique set of fingerprints, defined by the unique pattern of friction ridges on the surface of finger. As these friction ridges come together on a fingerprint, they form identifiable patterns that are distinctive between individuals. There is various elements of data used from the fingerprint in authenticating a user, ridge flow, ridge correlation, minutiae points, micro-minutiae points and others. Within these patterns may be a myriad of identifiable features unique to an individual such as a core, a bridge, a crossover, a bifurcation, a rod end, an island, an enclosure, or other feature. Determining whether one fingerprint matches another fingerprint requires comparison of the patterns and features of the enrollment prints to the authentication prints to determine if the user submitting the authentication is the same or different from the enrolled user. However, todays devices are incorporating smaller and smaller fingerprint sensors, which capture only a partial print, determining whether a submitted print matches a previously taken template becomes more difficult, and the chance of error increases. Either the user or service provider must sacrifice security, and accept a higher rate of error, or a user must sacrifice convenience, and provide a series of partial prints.

SUMMARY

A method for authenticating a user on a device is provided. The method comprises receiving an authentication request. The method also comprises checking a memory cache for available biometric data. The method also comprises retrieving the available biometric data from the memory cache. Retrieving available biometric data comprises retrieving a plurality of biometric data portions. The portions are retrieved such that a first biometric data portion is retrieved before a second biometric data portion. The second biometric data portion was captured before the first biometric data portion. Retrieving available biometric data also comprises determining whether each of the plurality of biometric data portion comprises verified biometric data. The method also comprises comparing the retrieved biometric data portions to an enrollment template and, upon determining that the retrieved biometric data portions matches the enrollment template, indicating that an authentication is complete.

DETAILED DESCRIPTION

Any authentication mechanism using fingerprint data needs to be convenient for consumers, yet secure enough to protect their data. If a user is able to enter an entire fingerprint for an authentication on a mobile device, the process of accurately determining whether a later print matched or did not match is a more accurate one, and merely requires comparison of the two prints for identifying fingerprint features.

However, as users more frequently access sensitive data through devices with smaller and smaller fingerprint sensors, namely mobile phones and tablets for. As the sensors that read biometric data shrink, the data captured is reduced, and so is the ability to differentiate. For example, in smartphones the sensor area available to capture touch input from a fingerprint may measure as small as ⅙ by ⅙ inch. This is in contrast to an average fingerprint which measures ½ by 1 inch.

Figure 1:
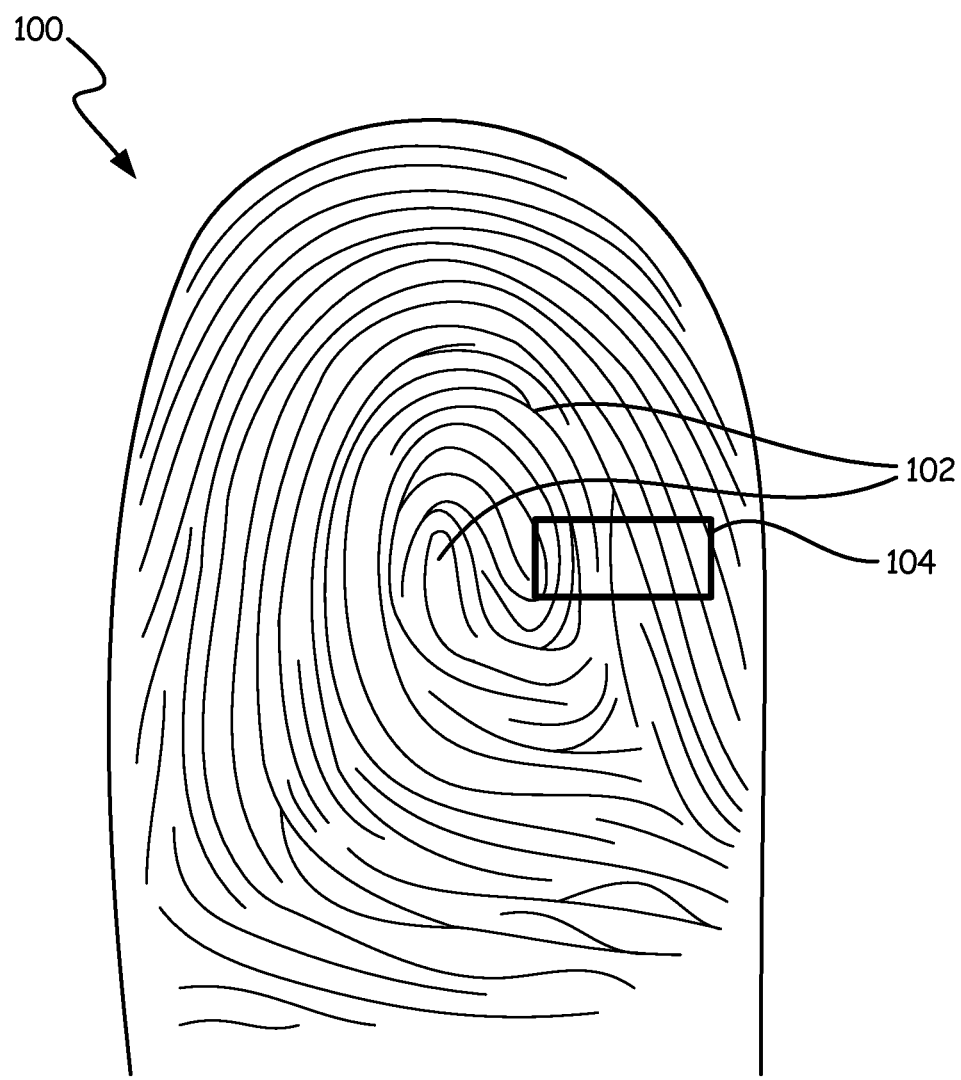
FIG. 1 is a representation of an exemplary fingerprint.

FIG. 1 shows such an exemplary fingerprint 100. Fingerprints are identifiable and separate individual users from each other by specific features 102. These features 102, when considered across the entire finger print, clearly identify one user from another. However, the identification process is different when the sensor is too small to capture an entire finger print. For example, as shown in FIG. 1, exemplary capture area 104 does not happen to contain any identifying features 102. Therefore, identifying a user by this capture area 104 presents a difficult security challenge as many users may exhibit a very similar partial print on a portion of one finger. One set of lines looks remarkably similar to another set of lines.

Because of the small sensor area available, obtaining a complete print for authentication may require, in one embodiment, a user to enter a series of fingerprint data by touching or swiping across the sensor area during a capture time period. However, this may not be a solution that meets the needs of the customer regarding convenience. In fact, many device manufacturers are limiting the number of touch prints deemed acceptable to authenticate a user, with their customers in mind. This limits the maximum level of security that can be obtained.

Figure 2A:
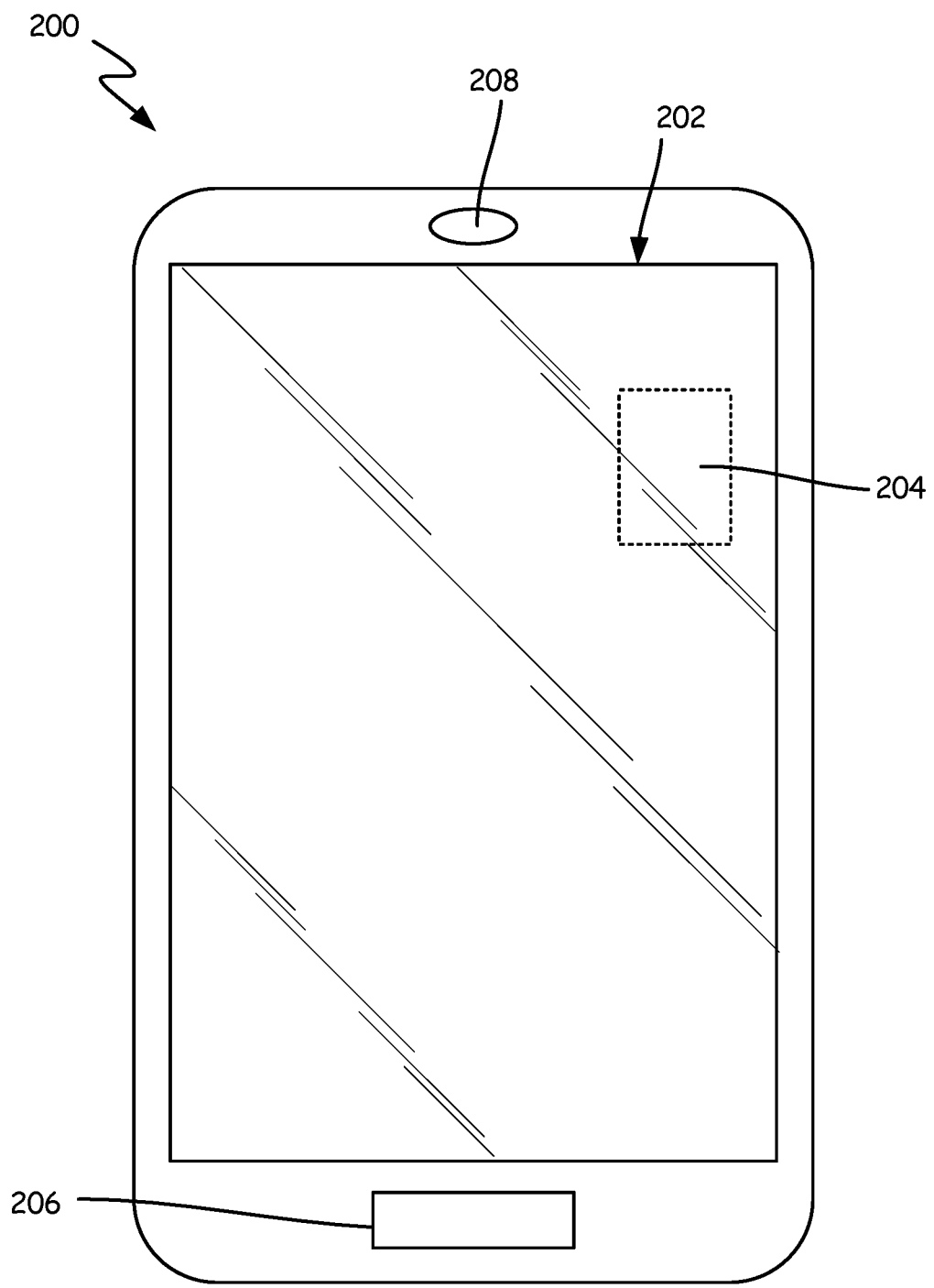
FIG. 2A is a representation of an exemplary device capable of reading fingerprint data.

FIG. 2A is a representation of an exemplary device capable of reading fingerprint data. The device 200 may, for example, be a cellular phone with a touch screen, a laptop with a fingerprint sensor, a tablet, or any other electric device capable of receiving fingerprint data. In another embodiment, the device 200 may be a camera, or other electronic device. The device 200 may have a screen 202. Many devices today can accept biometric inputs, for example, fingerprint input, through a variety of different mechanisms. In one embodiment, the fingerprint or portion of a fingerprint may be taken by device 200 through a screen sensor element 204, where the screen sensor element may be in a dedicated portion of the screen or may be built into the entirety of the screen 202. In another embodiment, the sensor may be built into a button element 206. Further, in yet another embodiment, the biometric data may be taken through a camera element 208, wherein a user may hold their finger above the camera element 208 such that a picture is taken of their finger and the fingerprint data is collected in this manner.

Figure 2B:
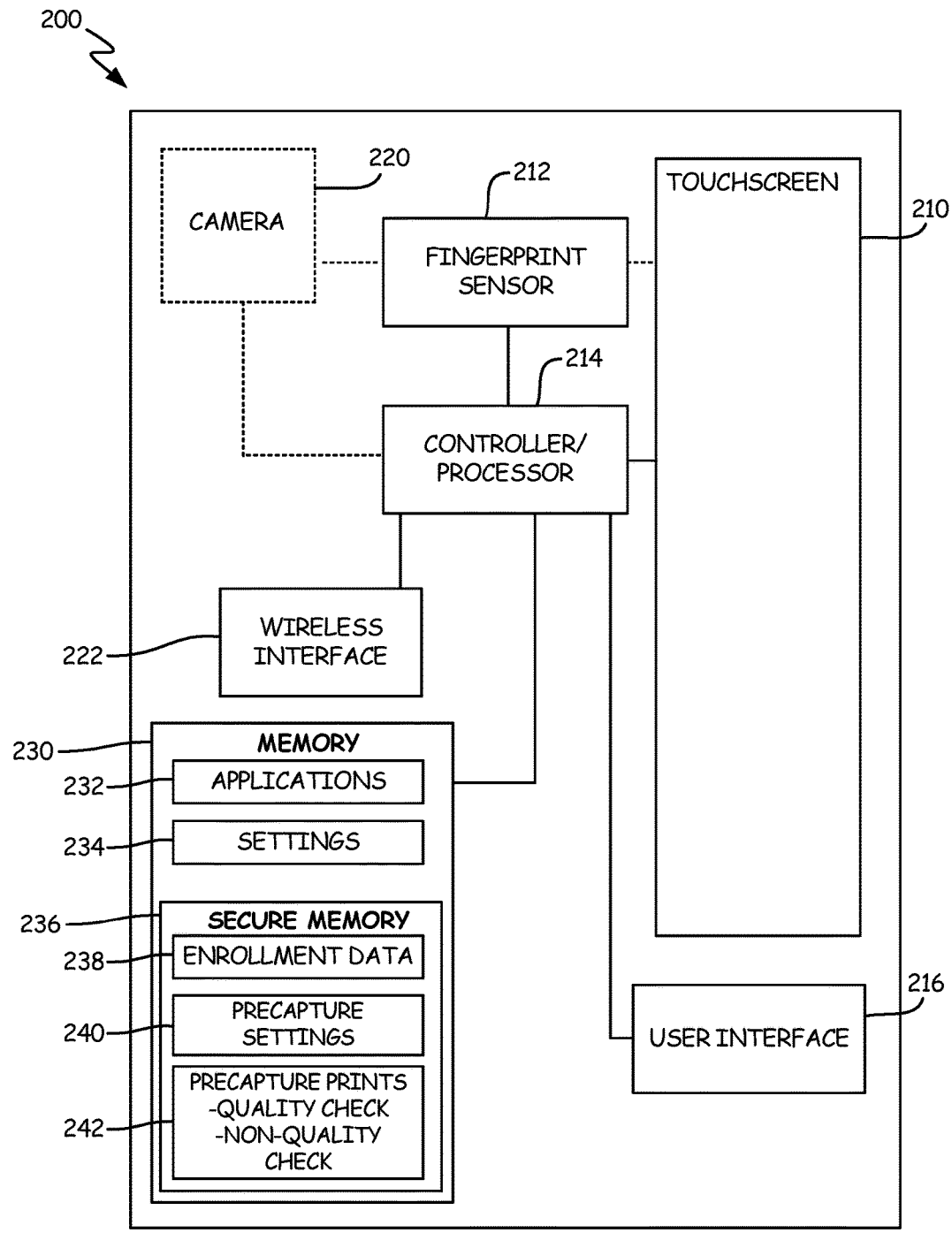
FIG. 2B is a block diagram of an exemplary device capable of reading fingerprint data.

FIG. 2B is a representation of an exemplary device 200 capable of reading fingerprint data. Device 200 comprises, in one embodiment, a controller or processor 214. Device 200 also comprises, in one embodiment, a fingerprint sensor 212. Device 200 may comprise, in one embodiment, a screen 210, which may be a touchscreen. Fingerprint sensor 212 may be incorporated into screen 210, or a camera 220, or may otherwise be accessible through the device 200. The controller 214 may communicate, in one embodiment, with a wireless interface such that a user of the device 200 may access the internet or an intranet, or otherwise communicate with another device. The device 200 may also comprise, in one embodiment, a memory 230. The memory 230 may comprise, in one embodiment, an applications memory 232. The memory 230 may also comprise, in one embodiment, a settings memory 234.

The memory 230 may also comprise, in one embodiment, a secure memory 236. Fingerprint data captured by the fingerprint sensor 212 may be stored, in one embodiment, in the secure memory 236. Secure memory 236 may also comprise, in one embodiment, enrollment data 238. Enrollment data 238 may comprise fingerprint data taken during an initial enrollment of a user on the device 200, as described in further detail below. Secure memory 236 may further comprise precapture settings 240, where precapture settings 240 refers to the settings governing a method of capturing fingerprint data prior to a request for authentication, as described in detail below. Secure memory 236 may also comprise a cache 242 containing fingerprint data captured during a precapture period, as described in detail below. The fingerprint data in the cache 242 may be separated, in one embodiment, into data that has undergone a quality check from data that has not. In another embodiment, none of the fingerprint data in the cache 242 undergoes a quality check until the authentication request is received.

One concern with collecting and storing biometric on a portable device is that the information is potentially available if the device is stolen, and it may be vulnerable to hacking. One common feature of devices, primarily mobile devices, is the ARM processor manufactured by many manufacturers for example, NXP, ATMEL, Qualcoom, Snapdragon, or ST Microelectrics. The ARM processor may also have a TrustZone feature which, in one embodiment, provides for higher security level of stored data and processing capability. Processor 214 may also contain, in one embodiment, a Trusted Execution element, for example, that provided by Intel. In one embodiment, the Trusted Execution Element, is where the biometric samples are housed during the precapture period prior to authentication. In one embodiment, secure memory 236 is associated with such an ARM processor.

Biometric data authentication works well on many physical platforms, with sensors easily accommodated into the hardware of a device, for example, device 200, in a position convenient for the user. In one embodiment, fingerprint sensor 212 is a radio-frequency (RF) sensor, for example an RF capacitive fingerprint sensor such as that produced by AuthenTec Trueprint Technology. In another embodiment, sensor 212 is an optics-based sensor. In another embodiment, the sensor 212 could be a complementary metal oxide semiconductor (CMOS) based sensor. In yet another embodiment, the sensor 212 could be ultrasonic based. These and other appropriate sensors could be incorporated into the hardware or software of a mobile device 200, or other hardware like a tablet, Internet of Things (IoT) device, vehicle, home automation or many others, for example, through screen sensor element 204, button element 206, in a bezel on the back of device 200 (not shown), or camera element 208. In an alternate embodiment, sensors 212 can be incorporated into non-screen portions of the device 200, for example, on the back, sides, or other non-screen portions of the device 200. In an alternate embodiment, sensors 212 can be incorporated directly within the screen component 210 of the device, such as screen sensor element 204, either in a dedicated portion of the touchscreen component 210 or throughout the entirety of the touchscreen component 210 such that any portion of the screen can collect biometric information. In another embodiment sensor 212 may receive data through camera 220 or other touchless capture technology capable of receiving visible, infrared or other wavelengths of light or even forms of ultrasonic or radio wave technology.

Single Touch and Swipe Capture of Fingerprint Data

Biometric sensors can be configured to collect biometric data such as fingerprint data from a large area or a small area of screen sensor element 204. The advantage of covering a large area is that more biometric data can be captured more efficiently. For example, a one inch square area could capture an entire fingerprint. However, an area that large may not be available. For example, in an embodiment where the sensor 212 comprises a portion of the home or a power on/off button, the area may be too small to capture an entire fingerprint, or even the majority of a fingerprint.

Figure 3A:
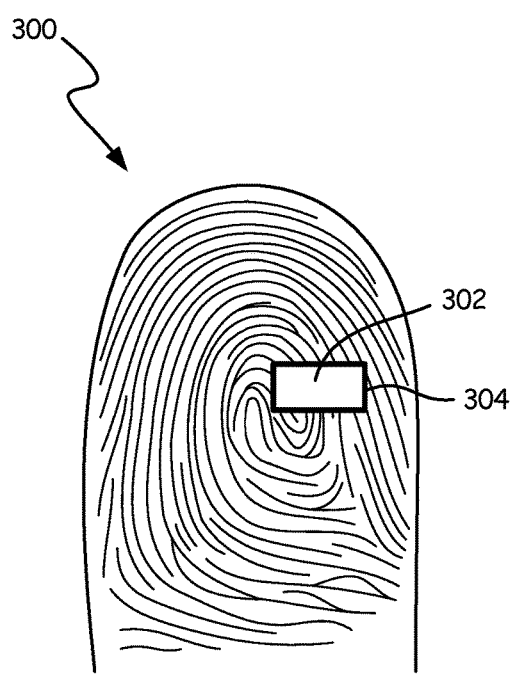
FIGS. 3A-3D illustrate exemplary fingerprint data representing multiple portions of fingerprint data taken during an exemplary authentication or enrollment process.
Figure 3B:
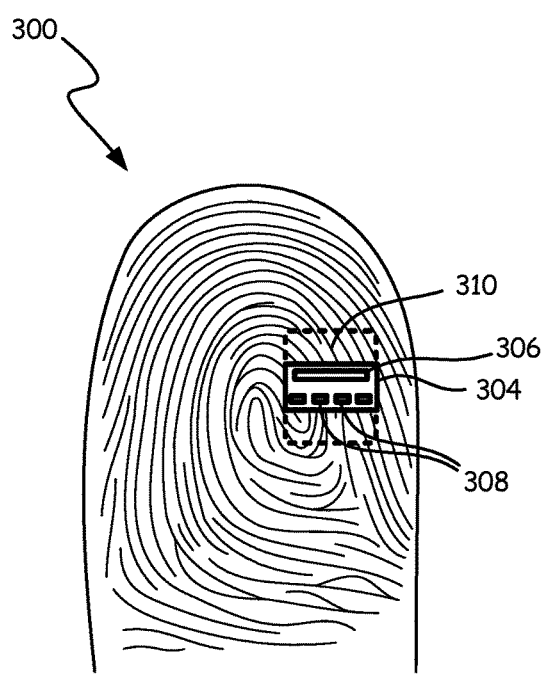

FIGS. 3A and 3B show different mechanisms for capturing a single portion of fingerprint data from a user. In one embodiment, a portion of fingerprint 300 is taken as touch data 302 through sensor area 304. Sensor area 304 may be configured to accept either touch data 302 as shown in FIG. 3A or swipe data 310 as shown in FIG. 3B. In one embodiment, where the sensor area 304 is configured to accept touch data 302, a user simply has to touch their finger to the sensor area 304 and touch data 302 is captured throughout by at least a portion of the sensor area 304. In one embodiment, the sensor area is configured to capture a series of images as the finger is swiped over it. The series of images is then either assembled, or not assembled and provides for a larger amount of data to match for better accuracy or higher reliability. In another embodiment where the sensor area 304 is configured to accept swipe data 310, only a portion of the sensor area 304 is active, represented by active sensor 306 that extends across a majority of the sensor area 304. In addition to sensor area 306 one or more speed detectors 308 are used to determine the speed at which a finger is swiped across the sensor area 304. In one embodiment, the active sensor 306 is engaged by a user's finger prior to the speed detectors 308 being engaged. In another embodiment, the user's finger first engages the speed detectors 308 and then passes over the active sensor 306. While FIGS. 3A and 3B show two different sensor area configurations, in another embodiment, the same sensor area 304 is able to accept either touch data 302 or swipe data 310 depending on which type of data is input into the sensor area 304 by the user.

In one embodiment, the sensor area 304 can switch between the touch sensor configuration of FIG. 3A and the swipe sensor of FIG. 3B, based on an indication from the entity requesting a biometric sample. For example, a financial institution may only require a single touch data 302 to allow a user to log into a financial application, but may require a swipe data 310 in order to approve a financial transaction. Further, an online store, for example the Google Play store or the Amazon.com retail site, may also allow a single touch data 302 for a user to log into their website, but may require a swipe data 310 in order to use a stored credit card to complete a purchase.

In one embodiment, the sensor area 304 may automatically switch between the sensor area 304 and 310, but may provide an indication to a user that a different input method is requested. For example, device 200 may provide a pop-up indication on a screen presented to the user indicating that the user needs to either touch or swipe sensor area 304 in order to compete their desired action in the application or website.

The advantage of combining both a touch and a swipe capture system is such that it allows the device 200 to capture more information from a single interaction with the user. As shown in FIG. 3B the swipe data 310 is the same width as the touch data 302 but extends longer, allowing for greater fingerprint data to be captured without the user being required to use multiple touches. This is desired by many device and application manufacturers such that it allows a user to rapidly authenticate themselves, while maintaining security, in an efficient manner. In another embodiment, the device 200 may receive an indication from an application that a user is most-likely going to be entering touch data 302 or swipe data 310. Further, the ability to switch back and forth between a sensor accepting touch data 302 and swipe data 310, is that it allows application manufacturers, website owners, and device manufacturers to provide the convenience of accepting touch input 302 for lower security transactions, but also have the option to capture the greater amount of data from a swipe input for situations requiring higher security.

In one embodiment, the sensor or sensors 212 are integrated into a device 200 such that they are configured to anticipate the type of touch data 302 or swipe data 310 interaction the user will have with the device 200, and operates either as a touch or swipe input receiver. This may be accomplished, in one embodiment, by internal sensors within the device 200, such as accelerometers or other motion detection sensors.

In a further embodiment, the sensor 212 detects the type of touch independent from indications given by an application, but instead by detecting an indication of a touch or swipe input. For example, in one embodiment, the sensor 212 detects that the user's finger is in motion and converts to a swipe sensor configuration in response to such detection. In another example, the sensor 212 detects the user's finger is stationary and converts to a touch sensor configuration.

In an embodiment where the device 200 can switch between accepting touch data 302 and swipe data 310, the change may be triggered by an indication from the entity requesting the data. This may be, for example, the device 200 itself as part of an authentication or enrollment. The device may require a touch data 302, in one embodiment, as part of the process of allowing a user to turn off the device 200, or access a home screen from a sleep mode. The device 200 may require a swipe data 310, in one embodiment, as part of allowing a user access to their e-mail, or access to certain setting options. The entity requesting the data could also be an application choosing from a lower security authentication model (touch data 302) or higher security authentication model (swipe data 310). Further, the requesting entity could also be a website accessed on the device 200. Additionally, any requesting entity may request touch data 302 or swipe data 310 as part of an enrollment or authentication procedure.

In one embodiment, upon receiving an indication that a request for fingerprint data has been made, the controller 214 may communicate that request to the sensor 212. The sensor 212 may then retrieve the requested data, either as touch data 302 or swipe data 304. This data may be retrieved passively as a user interacts with the sensor 212, for example as the user interacts with an application prior to the requested authentication. Alternatively, the data may be retrieved actively by the controller 214 providing an indication to a user of the device 200, for example as a pop-up or other indication, requesting data be provided. The indication may specify that touch data 302 is requested, or that swipe data 310 is requested, or that either touch data 302 or swipe 310 is acceptable. Upon the sensor 212 retrieving the data from a user, the controller then, in one embodiment, sends the requested data back to the requested entity.

In one embodiment, the single item of fingerprint data obtained as part of the transaction with the requesting entity is discarded once used, and not saved in memory 230 or secure memory 236. In another embodiment, the single item of fingerprint data obtained is saved in the precapture prints portion 242 of secure memory 236.

Multiple Touch and Swipe Capture of Fingerprint Data

Figure 3C:
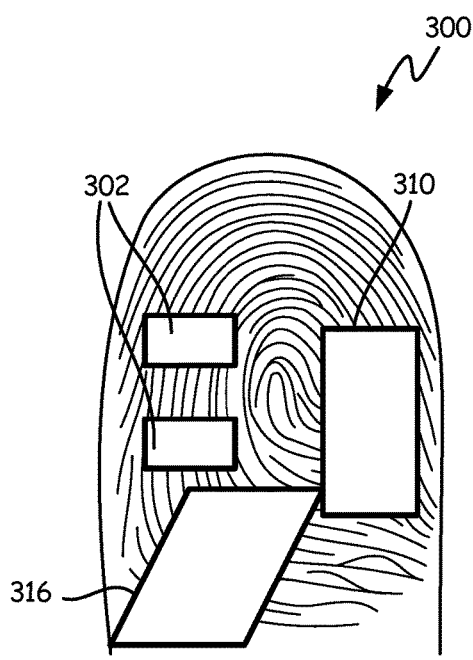
Figure 3D:
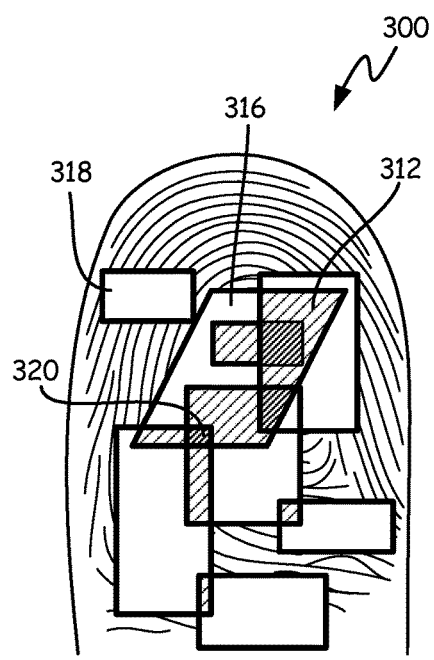

While the use of a sensor area 304 capable of switching between accepting touch data 302 and swipe data 310 is useful in a situation requiring a single touch enrollment or authentication from a user, it is also a useful feature of a system that stores a plurality of prints, as described below in further detail with respect to the precapture process. A further security precaution, in addition to the availability of switching from a touch to a swipe configuration may, in one embodiment, concern the position of the data captured on the fingerprint specimen. As discussed above, often the sensor area 304 is too small to capture an entire fingerprint specimen. Therefore, several different specimens may be required to obtain the requisite amount of data in order to be sure that a sample taken for authentication matches a previously-captured enrollment template. FIGS. 3C and 3D show two different sets of fingerprint data taken in an exemplary authentication process. In FIG. 3C, several touch data 302 and swipe data 310 have been captured from a fingerprint 300. Also shown in FIG. 3C is a nonlinear swipe data sample 316. Such a nonlinear swipe data sample 316 may result from a user moving their finger across the sensor shown in FIG. 3B such that it is moving in an atypical up and down fashion.

None of the samples in FIG. 3C have any overlap with any other segment. Overlap between collected data samples ensures that two different samples come from the same user. For example, many people are in the habit of allowing other individuals to use their devices, for example, to make a phone call. Or, in another example, a parent may allow a child to play a game on their tablet. However, the parent user of said tablet would not want a precapture system to keep the data collected from the child's touching of the screen for later authentication. In such a situation the parent may choose to require authentication through the precapture process to only use prints that either exhibit single overlap data 312 or multiple overlap data 320. This data may be used in conjunction with non-verified data 316. Additionally, the use of overlapping print data may be mandated by the device manufacturer, website owner or application developer in order to ensure security. Therefore, an increased security measure may be to discard all non-verified data 316.

In this way the precapture process for a device 200 owned by an exemplary parent user would ensure that all data kept is relevant to the main user of the tablet, and that data collected relevant to other users is discarded. However, in another embodiment, the user may choose to keep all touch data and, in such an embodiment, non-verified data 316 would be kept in the system. This may be advantageous as, in one embodiment, non-verified data 316 may later become verified if a later-captured print exhibits an overlap area.

Precapture Storage of Fingerprint Data

Without a full print, it may be difficult to authenticate the identity of a user above a certain accuracy threshold. This problem can be remedied, however, by taking multiple samples of biometric data. One solution previously mentioned to the problem of the small area of sensor 212 is to passively capture biometric data from the user during a time period prior to a request for authentication. For example, if a user has purchased a new phone, they may take several minutes to complete the startup process prior to the need to enter an authentication: for example, logging into an email account for the first time. During this initial startup process, the user may, for example, touch the screen or other sensor element 212 enough times that a composite print is achieved, or only requires a few additional touches to get the required amount of data for an initial enrollment, or authentication fingerprint sample. This ability to passively collect and store biometric data information allows for the generation of a composite biometric sample that serves as the required enrollment template or authentication sample.

Figure 4A:
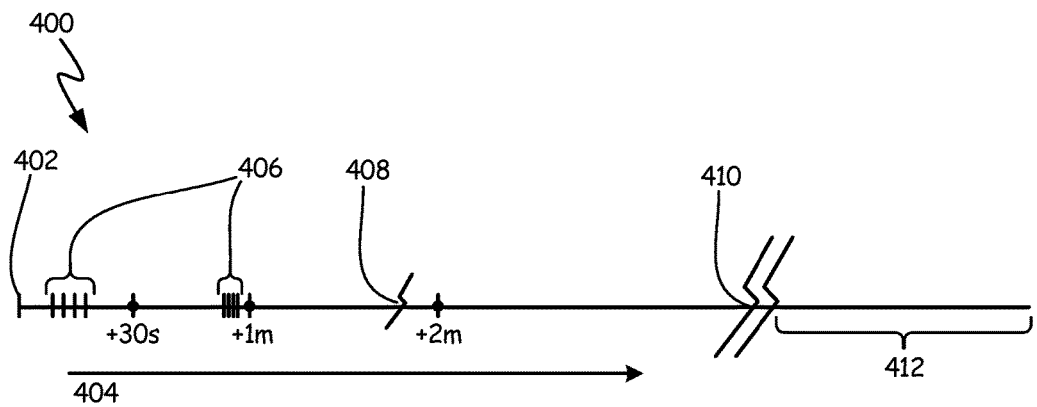
FIGS. 4A and 4B illustrate an exemplary cache of fingerprint data taken during a precapture process.

Both of the touch data 302 and swipe data 310 could be used in combination with a precapture process, which may, in one embodiment, passively capture the touch data 302 and swipe data 310 any time the user interacts with the sensor 212. For example, if the sensor 212 is in a button element 206, each time the user presses button element 206, a touch data sample 302 may be passively captured as part of the precapture process. In one embodiment, the sensor 212 may capture, and the device may store both touch and swipe data in a memory cache, for example secure memory 236. In one embodiment, any touch data 302 or swipe data 310 is tagged with a time stamp, such that the device is able to know how far away in time that data was acquired. In one embodiment, the time stamp is a relative time stamp such that the device is only aware that such a fingerprint sample was taken, for example, five seconds or five minutes or five days prior to a present authentication request. In another embodiment, the time stamp is tagged with an absolute date stamp, for example, that the information was captured on Thursday, Feb. 2, 2015 at 4:17 PM. FIGS. 4A and B show examples of such a relative time stamp.

This precapture process, in one embodiment, captures a plurality of data samples, in one embodiment as shown, for example, in FIGS. 3C and 3D, using an adaptive authentication template that continuously adds information to a stored biometric sample as the information is captured by the biometric sensor, or sensors 212. As shown in FIGS. 3C and 3D, each portion of an input by a user, represented by each of the touch data 302 or swipe data 310, is added to the stored biometric sample as they are received by the device 200, increasing the amount of data available for a secure authentication. This allows the device 200 to obtain enough biometric data to, in one embodiment, log the user in automatically in response to a request for authentication. In another embodiment, the precapture system provides a supplemental source of biometric data such that, instead of the typical 15-20 touches required, only a few touches are required to complete an authentication process.

Figure 4B:
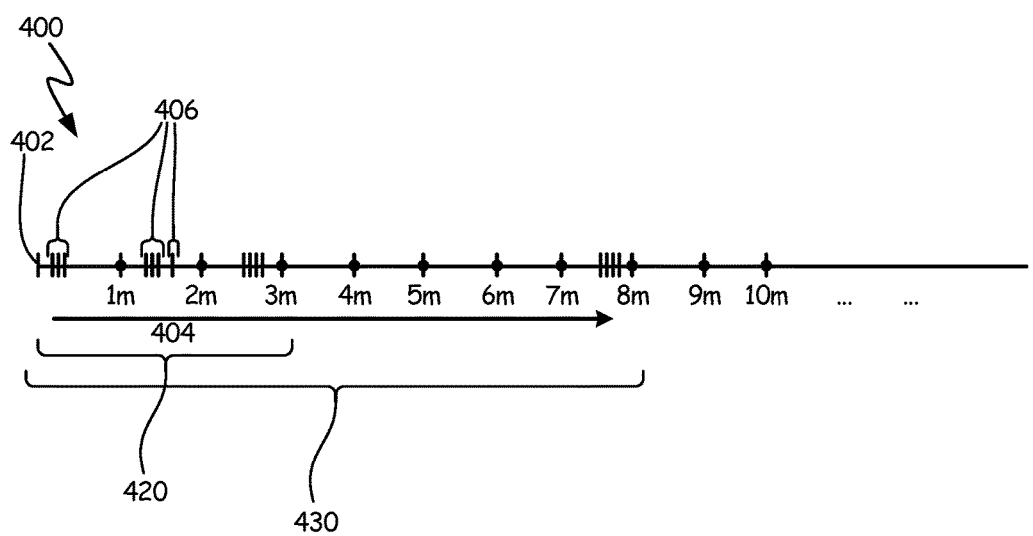

FIGS. 4A and 4B illustrate an exemplary cache of fingerprint data taken during a precapture process. In one embodiment, as shown in FIG. 4A, data samples 406 are received by the device 200 through sensors 212 as a user interacts with the device 200. Authentication request 402 occurs at a relative time 0, and the device 200 then retrieves a plurality of data samples 406 from the memory 230, or the secured memory 236. Each of the plurality of data samples 406 has a timestamp indicating how far away in time from the authentication request 402 each of the data samples 406 were taken. The timestamp is assigned based on the reverse time axis 404, relative to the authentication request 402. For example, as shown in FIG. 4A, a plurality of samples 406 were captured within 30 seconds of the authentication request 402, and another plurality were captured within a minute of the authentication requests 402. In one embodiment, the device pulls all available data at once to create a composite print for authentication, such as print 300 shown in FIG. 3D. In another embodiment, upon receiving a request for authentication, the device pulls data samples 406 in order of recency with respect to the authentication request 402. In one embodiment, the prints pulled in response to an authentication request 402 are part of the authentication period. The authentication period may be set by the device 200, or by the requesting entity.

In another embodiment, in order to ensure that all samples are from a single user, the trusted storage portion is periodically purged of all samples. Some triggers for a purge may, in one embodiment, include the shutdown or startup of the device, a preset inactivity period, or a dynamic inactivity depending on user activity. Additionally, the trigger may be a device determined trigger, such that the period of inactivity required for a specific device to power down its screen, a detection of a movement by GPS, a detection of hacking or break-in, a removal of a back cover, or a clear button/indicator is pressed, or a detection that the device 200 has been rotated past a certain trigger angle, for example more than 90 degrees. In this way, a user may be able to trigger a purge by holding their device 200 and moving their hand such that the device 200 detects this motion through internal accelerometers and trigger a purge.

In one embodiment, the purge is also triggered by a successful authentication, such that a user can now use the same print for two successful authentications without providing new samples through the precapture process described previously. As shown in FIG. 4A, an indicia of user change 408 was detected almost 2 minutes prior to authentication. The indicia 408 may be a turning of the device 200, for example, 90 or 180 degrees. The indicia 408 may automatically trigger a purge of all data or it may flag data occurring prior to the trigger as potentially compromised. In this way, the next authentication request 402 may trigger a purge of this data depending on the security necessary. In another embodiment, the device may detect that the indicia 408 was a turning of the device 200 in line with the confines of an application, namely switching the screen view from landscape to portrait. In such an embodiment, where the indicia 408 is not likely to indicate a switch between users, the indicia 408 may be disregarded by the device 200, and the data occurring prior to indicia 408 may not be purged. However, in an embodiment where overlap data 308 or 320 is required for an authentication sample, the flagged data may be rejected as non-verified data 316. FIG. 4A also shows a period of purged data 412 that occurred prior to a purge trigger 410. For example, the purge trigger may have been the device 200 turning off and then back on.

FIG. 4B shows a longer timeline 400 with more available data samples 406 for authentication, depending on the security required for authentication request 402. If the authentication requires a high level of security, for example a financial application, then only data samples occurring within a secured period 420 may be used, in one embodiment. If, on the other hand, a lower level of security is needed, for example a social media application, then a normal authentication period 430 may be used. In one embodiment, a normal authentication period 430 may extend back minutes, hours or even days depending on whether or not a dynamic or preset trigger 410 is received and a purge triggered.

Both the initial enrollment and all later authentication can be accomplished using a passive biometric data capture system as described above with respect to both the touch data 302 and swipe data 310. In one embodiment, biometric data is passively captured from a user during a time period when they are touching the touchpad or other biometric sensor 212. This may occur while they are completing a task generally unrelated to enrollment or authentication. For example, if a user has purchased a new phone, they may take several minutes to complete the startup process prior to the need to enter an initial authentication, or the required initial enrollment—for example, logging into an email account for the first time or setting the initial settings on the device.

During this initial startup process the user may for example, touch the screen enough times that a composite print is achieved with no or only a few additional touches to get the required data for a verifiable print. The ability to passively collect and store biometric data information allows for the generation of a more complete biometric sample that serves as the required enrollment or authentication, without requiring a user to enter touch or swipe date 15 to 20 times to achieve the print.

This process of passive collection of biometric information, in one embodiment, fingerprint data is referred to collectively as the precapture process as described previously, or the capture process outside of an authentication task or operation. This precapture collection occurs during a period before the user of a device, e.g. device 200 encounters an authentication requirement, defined as the period ending with the authentication and extending back in time for a specified length. The specified length of time depends both on the type of activity engaged in prior to authentication and the security level of the authentication. These time periods can be set by the device's user, device manufacturer, website the user seeks to enter, or the biometric data collection software provider. Additionally, the type of activity is considered—if the user is consistently tapping the screen in response to, for example, gaming stimuli, that may be considered more reliable than periodic clicks over a longer period of time. Or, if the device's user indicates through a saved setting that they use the device with multiple users, data 406 captured during a gaming application may be considered less reliable.

In the case where a greater level of security is needed than the biometric data cached during the precapture period, or where a website requires a secondary authentication period (for example, to complete a monetary transfer), a secondary security procedure may be implemented in addition to the biometric data collected during the precapture period. The precapture process is, thus, customizable based on preferences of the company whose content is accessed by a user. In one embodiment, the company is a website owner. In another embodiment, the company is an application developer. In another embodiment the company is a corporation working with its employees, partners, and customers for access to facilities, data or services.

In one embodiment, the company is presented with a user interface that allows them to set the thresholds for access. For example, the company may set a minimum number of data samples 406 that must be obtained during the precapture period in order to accept the authentication. In another embodiment, the company may require a certain number of single overlap data 308 or multiple overlap data 320 in order to ensure that the required security has been met. Since the adaptive authentication template continuously collects biometric samples provided by the user, the precapture process can accommodate the different threshold levels set by a company. In another embodiment, the company may only allow data collected during a set period of time, for example, the last five minutes. Additionally, the company may choose, in another embodiment, to require a second security authentication format. This customizability by the company allows the company to ensure that their customer's data is secure, with convenient access. The second security authentication format may be an alphanumeric password, or selection of a correct photo from a photo array or another verification mechanism.

Additionally, in one embodiment, the user of the precapture process can also customize their settings. This customization may occur, in one embodiment, on the device 200 through an application interface. It could also occur, in another embodiment, at the initial startup of the device 200 upon purchase. Further, in another embodiment, the settings are changeable by the user at a later point. Customization may also take place, in another embodiment, on a website later accessible and changed by the user. This provides an additional safety feature in that if a user does lose their device 200, they are able to ensure that data samples 406 are no longer accessible or usable by someone who later finds or has stolen the device 200, by making changes through a website interface.

The user may, in one embodiment, adjust the requisite tolerance levels for logging into different websites or applications, and may also set a preferred secondary security measure of website that requires a secondary security measure. For example, the user may set a password to accompany the use of their biometric information.

Additionally, the user may set precapture settings around automatic addition and purging of data samples 406 to and from the secured memory cache 236. The user may indicate, through the user interface, in one embodiment, that they wish for the precapture process to happen automatically in the background while they use the device 200. Alternatively, the user may indicate, in one embodiment, that the system request permission to add samples to the secured memory cache 236 when certain activities are taking place. For example, the user may request a permission screen to appear when games are played on a specific device, but give automatic authorization to add samples when the user's email or calendar is open. This allows the user the functionality to allow a friend or child to use the device in order play said games without the risk of their biometric information being confused with the user's.

Additionally, the user may, in one embodiment, configure settings around using their biometric samples in the secure memory cache 236. For example, the user may indicate that their device 200 is to automatically use the adaptive authentication template as a login mechanism, in one embodiment. Alternatively, the user may indicate, in another embodiment, that the user must ask permission before each authentication to use the stored precapture prints 242. These, and other settings may be saved in the general settings 234, or in the secured precapture settings 240. Once set up, the secured precapture settings 240 may not be accessible, in one embodiment, without a successful authentication. The user may also, in one embodiment, enter settings around quality checking data samples 406, either as they are received by the device 200, or when the authentication request 402 is received. Constantly checking the quality of data samples 406 may require considerable processor power and, consequently, may result in a shorter battery life. Instead, the user may choose to not have the data samples 406 checked for quality (e.g. resolution, size of print, overlap with earlier prints, etc.) until the authentication request 402 is received. In another embodiment, the device 200 may only check the quality of data samples 406 automatically when the device 200 is plugged in and charging.

The user may, in one embodiment, also configure settings around the storage of the biometric samples in the secure memory cache 236. For example, the user may indicate that their device 200 is to automatically use the adaptive authentication template as a login mechanism in one embodiment. Alternatively, the user may indicate in another embodiment, that the device 200 must ask permission before each authentication to use stored precaputre prints 242.

The user may, in one embodiment, also configure settings around the storage of the data samples 406. The user may, in one embodiment, set an indication to keep or change settings on a time-based interval, for example, once monthly or annually. The user may also, in one embodiment, set an indication to keep or change settings on a device-based interval, for example, at startup or shutdown of a device 200. Additionally, the user may, in one embodiment, set indications around when the secured memory 206 should purge the precapture prints 242. For example, the user may, in one embodiment, set a purge every time the device 200 is shutdown or, in another embodiment, set a purge each time the user opens a specific application. The user may also set times when a new enrollment should be taken, replacing the enrollment data 238 stored within the secure memory 236. In another embodiment, the enrollment data 238 can only be purged through access of a website of the biometric software provider.

Enrollment and Authentication Methods

There are a number of different reasons that a device manufacturer or application manufacturer would require a fingerprint sample from a user. In one example, a device manufacturer may take an initial enrollment print from a user during the first time that a user uses the device 200. For example, this enrollment process may be initiated when a user first opens a device 200 and takes it out of the box. However, in an alternate embodiment, the enrollment period may be triggered by the user at a later time. For example, if a user is having their device 200 setup by the manufacturer, for example, a new phone setup at the phone service provider, the enrollment period may be activated such that print data taken by an employee of the manufacturer is not accepted as part of the initial enrollment print.

Another reason that biometric data may be required would be for an authentication procedure, where the device 200 or an application running on the device 200 seeks an authentication sample from a user and compares it back to that original enrollment print(s) in order to determine that the user is the owner of the device 200. While many device manufacturers allow the user to provide 15 to 20 touches during an enrollment period, the amount of time that it would take for a user to provide this many touches during an authentication period is often not acceptable from a convenience standpoint.

Figure 5:
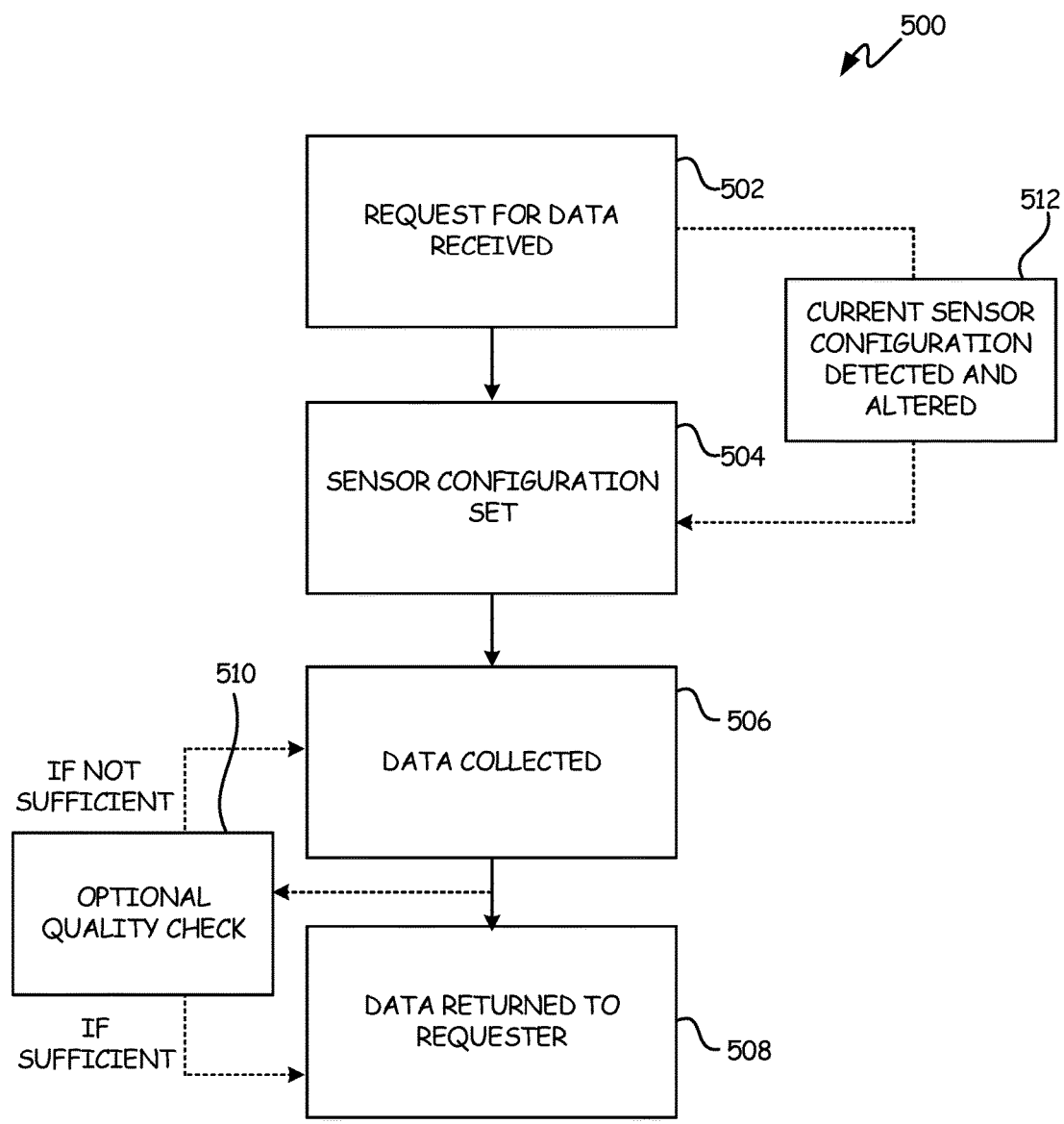
FIG. 5 illustrates an exemplary method for a single-touch authentication or enrollment of fingerprint data.

In the single-touch embodiment described above, the method of enrolling a user upon receiving a request for enrollment, and the method of authenticating a user upon receiving a request for authentication follow that shown in FIG. 5.

The single-input method, which may be either an enrollment or an authentication of a user, 500 starts in block 502 when the system detects a request for fingerprint data. As discussed above, the request may come from an outside entity, for example a website or an application, or from the device 200 itself, for example as part of a turn on/turn off procedure or to access the home screen from a locked or sleeping mode.

After receiving the request for data in block 502, the system then determines the appropriate sensor configuration in block 504, namely either a touch input configuration or a swipe input configuration. In one embodiment, the requesting entity may require the sensor 212 be configured to receive specifically touch data 302 or swipe data 310. This could be for required for security considerations, or other reasons. Optionally, the system may detect a current sensor configuration and switch to the desired sensor configuration, in block 512. In an embodiment where the device 200 has multiple sensor inputs, for example both a button sensor element and a screen sensor element, this may require switching from a touch input through the button to a swipe input on the screen, for example, or it may require switching a single sensor element from a touch input configuration to a swipe input configuration, as shown in FIGS. 3A-3B with sensor area 304. In another embodiment, the system anticipates the appropriate input configuration based on prior user actions (for example, multiple touches or swipes as part of a gaming application) or based on previous user interactions with the requesting entity. For example, a user may typically swipe across the screen to open an e-mail application. Therefore, in block 504, when an authentication requests comes from an e-mail application, the system may anticipate that the user will input a swipe data portion 310. Additionally, the device 200 may anticipate the type of input in another appropriate manner.

In block 506, after the sensor configuration is set, the sensor 212 receives data from the user. This may be the requested touch input 302 or swipe input 310, in one embodiment. The data may then go through an optional quality check in block 510. In one embodiment, the quality check is not done by the system performing method 500, but by the requesting entity once the data is returned, in block 508. The method ends, in one embodiment, in block 508 with the collected data being returned to the requesting entity.

In one embodiment, the device 200 then discards the collected data and does not retain a copy. This may be useful, for example, in the embodiment where multiple users use a single device 200. A user may choose to only allow the device 200 to use a single-input enrollment/authentication method such as method 500 because retaining fingerprint data, for example, may result in conflicting data inputs in the secure memory 236. In another embodiment, while the device 200 may use a single-input method, such as method 500, for a given authentication or enrollment, it may also store the collected data as one input. In one embodiment, a successful single-input authentication may be the basis for accepting or rejecting other prints as overlapping data 320, as discussed above with respect to FIGS. 3C and 3D.

Figure 6:
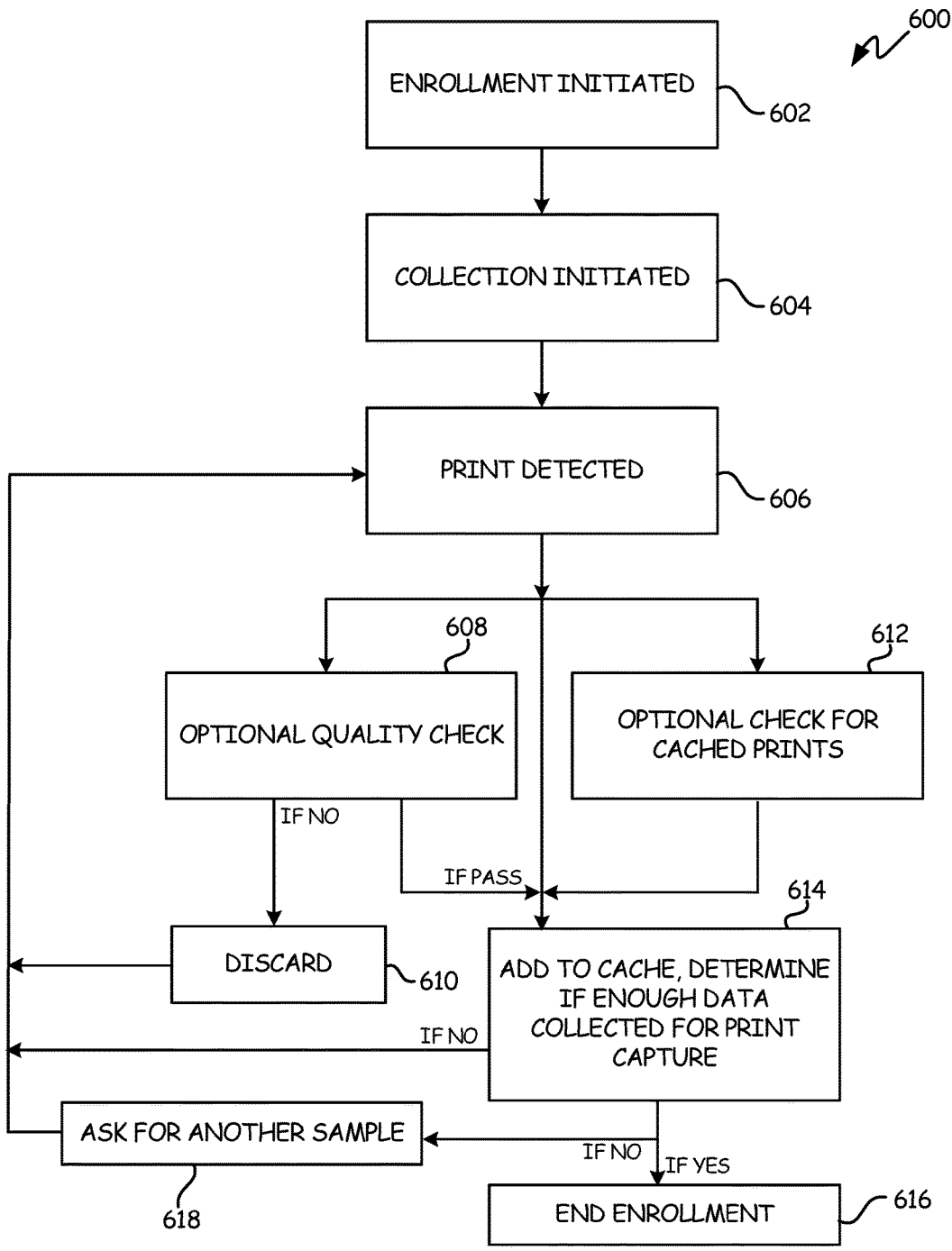
FIG. 6 illustrates an exemplary method for gathering initial fingerprint data for enrollment of a fingerprint template.

FIG. 6 illustrates an exemplary method for gathering initial fingerprint data for enrollment of a fingerprint template. As set forth above, the enrollment template may be periodically purged based on user or manufacturer settings, in one embodiment. In another embodiment, the enrollment template may be stored within the secure memory 236 as enrollment data 238 and not purged without a trigger from the user or device manufacturer.

The enrollment method 600 starts in block 602, with an enrollment initiation. As described previously, this initiation may occur upon the device being taken out of a box for the first time, or it may occur at a later date. For example, in one embodiment, a popup may appear on the device 200 for the first time asking if the current user of the device 200 is the owner of the device 200. In such an embodiment, if the device 200 is being setup by a manufacturer or other service provider, the touch data 302 and swipe data 310 provided by the service provider will not be used as part of the enrollment template. In such an exemplary embodiment, the employee of the manufacturer or the service provider may be able to initiate enrollment at a later time. The enrollment initiation in block 602 may also take place, for example, when the user sets up or uses a trusted application for a first time, for example their email or a social media application.

Once the enrollment is initiated in block 602, the method then progresses to block 604 where the collection is initiated. This may take place immediately upon the user providing an indication that the device 200 is theirs, or it may occur several seconds later, for example, if the manufacturer's employee indicates that the device is being turned over to a user (for example, the device 200 detecting a 90 or 180 degree turn, or the employee affirmatively indicating a transfer), then the earliest set of data samples 406 may be discarded. In another embodiment, the first set of data samples is always discarded until the device owner takes active steps to initiate passive capture of data samples 406 for enrollment, for example, by changing settings within the device 200.

In another embodiment, the collection may be initiated by a first print being detected in block 606. Once the print is detected it may go through an optional quality check process as shown in block 608. This may result in a processor of the device 200 checking the quality of the print to ensure that sufficient features 102 are detected to identify the print detection in block 606 as having sufficient resolution to be used for a later authentication. If the print detected in block 606 fails the optional quality check in 608 as shown in block 610, the print is discarded and the process goes back to detecting the next touch or swipe input.

Additionally, when the print is detected it may also trigger the device 200 to optionally check for other cached prints in secure memory cache 236, as indicated in block 612. For example, in the embodiment where the enrollment is initiated upon detecting a user logging into an e-mail for the first time, for example, the device 200 may note that there was no interruption between that selection of initiating the enrollment period during the opening of the email and a prior period where a user was interacting with the screen, for example in setting up a social media account. This may be sufficient for the device to determine that cached prints in relation to that earlier action, for example those collected while setting up the social media application, are sufficient to be used as part of the enrollment process and this is done in block 612.

In the event that a new print is detected, the device 200 then adds the current print to the secure memory cache 236 and determines if there is enough data collected for an initial enrollment print to be captured, as indicated in block 614. If there is enough data the process ends. If there is not enough data the method goes back to block 606 to detect another print. Additionally, this may involve an optional popup or other indication to a user that more data is needed, as indicated in block 618. If enough data is collected for an enrollment print to be captured and stored in the enrollment data portion 238 of secure memory cache 236 the process ends at block 616. In one embodiment, the enrollment period may be initiated periodically, for example, annually to update the enrollment data 238.

Figure 7:
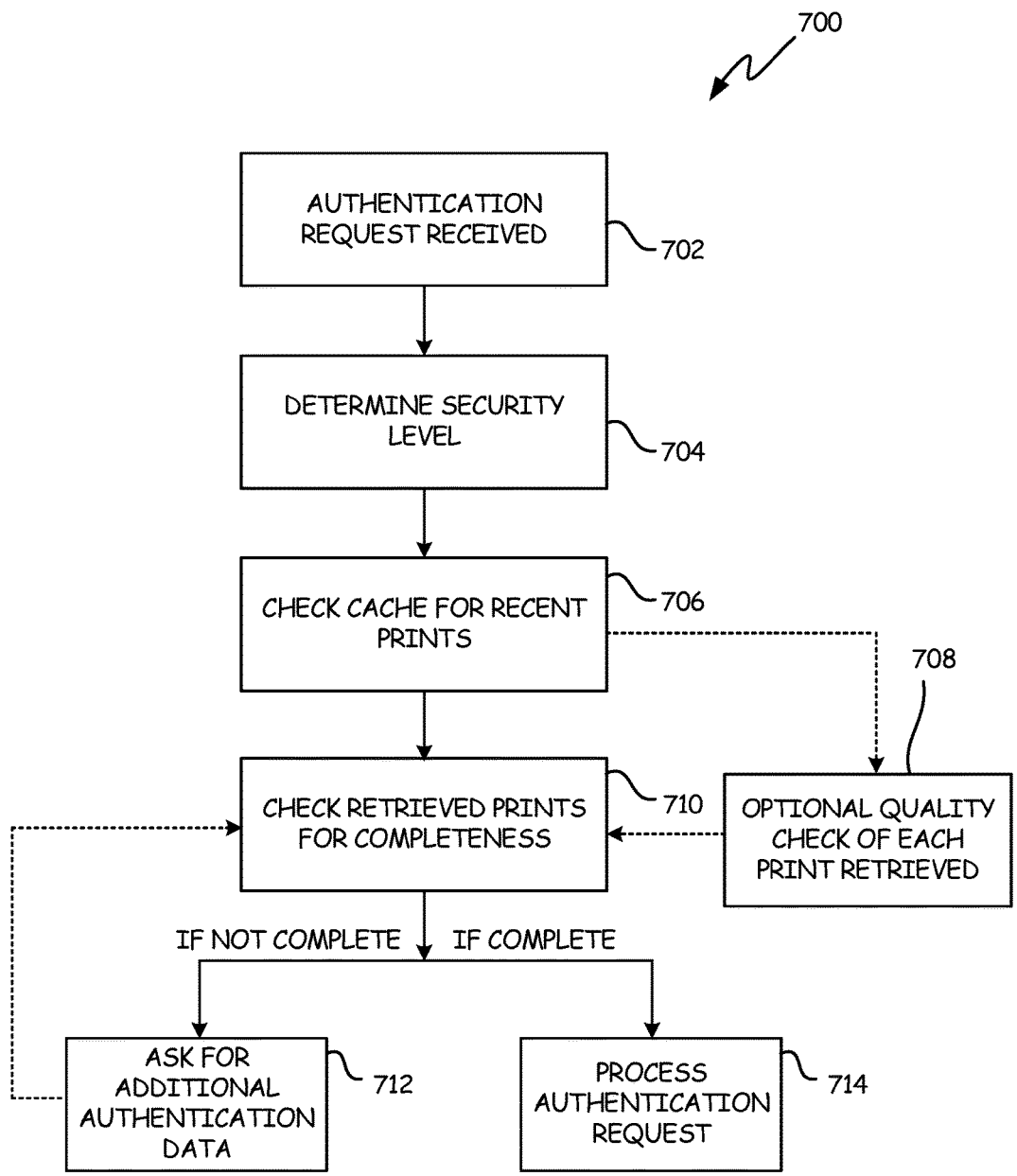
FIG. 7 illustrates an exemplary method for gathering fingerprint data for authentication against the fingerprint template.

FIG. 7 illustrates an exemplary method for gathering fingerprint data for authentication against the fingerprint template. The fingerprint template may be, for example, taken through method 600. However, the exemplary method of FIG. 7 could be used to authenticate a print against an enrollment template taken through a different method. In one embodiment, the authentication method 700 starts when an authentication request, such as authentication request 402, is received in block 702. This authentication request may come, for example, from an application installed on the device 200, or from a website, or from a settings requirement within the device 200 itself.

Once the authentication request is received in block 702 the method then moves onto block 704 where a security level is determined for the authentication request. The security level may depend, for example, on the sensitivity of the transaction request by the authentication, for example, a financial transaction may have a higher security level then logging into or making a post on a social media website. Once a security level is determined in block 704 the device 200 may then determine, based on the security level, a time period acceptable for pulling recent touch data 302 and swipe data 310 from the memory cache. A higher security level may only allow for cached prints to be used from a period of up to a minute, for example, whereas a low security threshold may allow prints from the last time the device was turned on, which could, for example, be up to a period of days depending on the habits of a user. In one embodiment, upon determining an appropriate authentication period, the device checks the cache for recent prints in block 706.

In one embodiment, the prints in the cache go through an optional quality check in block 708. In one embodiment, the optional quality check is done every time the device takes a touch data 302 or a swipe data 310. However, constantly using the CPU of a device to check the quality of every touch data 302 and swipe data 310 requires a considerable amount of battery and most users will not want this as part of their experience using device 200. Therefore, to compensate for the fact that touch data 302 and swipe data 310 are not checked for quality when they are originally taken the authentication method may add this additional quality check in block 708. However, this quality check in block 708 is not necessary in the embodiment where touch data 302 and swipe data 310 are checked when taken. For example, in one embodiment, touch data 302 and swipe data 310 may be checked automatically when a user opens up an application or logs into a website for a transaction. The indication of high security required by the user logging into a financial institution application on a device 200, in one embodiment, may be sufficient to trigger the device to begin checking later touch data 302 and swipe data 310 taken between the time that the user logs into the financial institution application such that when the user goes to authenticate a transaction within such a high security application, additional option 708 is not necessary in another embodiment.

Once recent prints within an acceptable time period are determined and compiled, there is an additional step in block 710 to check the quantity of the collected prints and the quantity prints to determine whether or not there is a sufficient composite print detected in order to fully compare the authentication with the enrollment print previously taken. If there is a sufficient quantity and quality of collected fingerprint data the process then moves on to block 714 wherein the authentication request is processed. If instead a sufficient quantity or quality is not detected the process moves to block 712 where the user is presented with the request for additional authentication data and the method goes back to block 710 to then check the quality of the additional fingerprint data gathered. In this manner, the user may completely bypass the need to enter either a password or fingerprint data if there is enough data in the precapture store 242. This sufficiently decreases the number of times that a user has to input fingerprint data in order to authenticate securely.

Some examples of additional security measures may include a controlled response where the user enters a predefined keyword, or an answer to the question that only the user would know, for example, who the user's third grade teacher was. Another secondary measure would be multiple types of sensors used in conjunction—for example, the RF sensors in the phone in conjunction with an NFC sensor in the user's car or on the user's keychain. Further, the device could also use the user's location as a secondary security measure: in one embodiment, the device could sense that the user is in a trusted location such as home, office, or a commonly frequented coffee shop and use that as a secondary authentication means. Additionally, in another embodiment, the secondary authentication measure may be a camera on the device 200 that takes a picture. Any of these secondary security means may be used in conjunction with precaptured biometric information to provide a more secure authentication process.

Although the present invention has been described with reference to preferred embodiments, workers skilled in the art will recognize that changes may be made in form and detail without departing from the spirit and scope of the invention. For example, while embodiments of the present invention have been described with respect to fingerprints, as fingerprints provide a unique and reliable biometric sample for authentication, one skilled in the art would understand that other biometric data could also be used with the systems and methods described, for example iris patterns, DNA, etc.

What is claimed is:

1. A method for authenticating a user on a device, the method comprising:
    receiving an authentication request;
    checking a memory cache for available biometric data using a processor of the device;
    retrieving, using the processor, available biometric data from the memory cache, wherein retrieving the available biometric data comprises: retrieving a plurality of biometric data portions being swipe fingerprint data that is stored within the memory cache, wherein the portions are retrieved such that a first biometric data portion is retrieved before a second biometric data portion, wherein the second biometric data portion was captured before the first biometric data portion;
    determining, using the processor, whether each of the plurality of biometric data portion comprises verified biometric data;
    determining a security level of the authentication request, wherein the security level may be determined in part by the application initiating the authentication request;
    and comparing, using the processor, the retrieved biometric data portions to an enrollment template and, upon determining that the retrieved biometric data portions matches the enrollment template, indicating that an authentication is complete.

2. The method of claim 1, and further comprising: rejecting any non-verified biometric data portions upon determining that the security level of the authentication request is a high security level.

3. The method of claim 1, wherein determining whether the second biometric data portion comprises verified biometric data portions comprises determining whether there is overlap between the first biometric data portion and the second biometric data portion of retrieved biometric data.

4. The method of claim 1, wherein the retrieved biometric data portion is retrieved in reverse order based on an associated time stamp.

5. The method of claim 1, and further comprising:
    performing a quality check on each retrieved biometric data portion.

6. The method of claim 1, and further comprising:
    performing a quantity check on retrieved biometric data portion prior to comparing the retrieved biometric data to an enrollment template; and upon determining that there is insufficient retrieved biometric data, requesting an additional biometric data sample from the user.

\* \* \* \* \*